US006692557B1

(12) United States Patent
De Nys et al.

(10) Patent No.: US 6,692,557 B1
(45) Date of Patent: Feb. 17, 2004

(54) ANTIFOULING OF SHELLFISH AND AQUACULTURE APPARATUS

(75) Inventors: Peter Canisius De Nys, Bronte (AU); Peter David Steinberg, Newtown (AU); Timothy Stuart Charlton, Erskineville (AU); Victor Christov, Regent (AU)

(73) Assignee: Unisearch Limited, New South Wales (AU)

( * ) Notice: Subject to any disclaimer, the term of this patent is extended or adjusted under 35 U.S.C. 154(b) by 0 days.

(21) Appl. No.: 09/463,341

(22) PCT Filed: Jul. 3, 1998

(86) PCT No.: PCT/AU98/00508

§ 371 (c)(1),
(2), (4) Date: Apr. 23, 2001

(87) PCT Pub. No.: WO99/05227

PCT Pub. Date: Feb. 4, 1999

(30) Foreign Application Priority Data

Jul. 24, 1997 (AU) .............................................. PO8211

(51) Int. Cl.$^7$ ............................. C09D 5/14; C09D 5/16; A01N 43/08; A01N 43/26
(52) U.S. Cl. ................. 106/18.35; 106/15.05; 106/16; 106/18.29; 106/18.33; 106/18.35; 424/48.09; 514/372; 514/439; 514/461; 523/177; 427/368; 427/421; 427/430.1; 427/458
(58) Field of Search ................ 106/15.05, 16, 106/18.29, 18.33, 18.35; 424/78.09; 514/372, 439, 461; 523/177; 427/421, 430.1, 458, 368

(56) References Cited

U.S. PATENT DOCUMENTS

| 4,129,448 A | | 12/1978 | Greenfield et al. ....... 106/15 R |
|---|---|---|---|
| 5,082,722 A | * | 1/1992 | Guglielmo, Sr. ......... 106/15.05 |
| 5,104,618 A | * | 4/1992 | Guglielmo, Sr. ................ 422/6 |
| 5,188,663 A | * | 2/1993 | Ikari et al. ................ 106/15.05 |
| 5,221,331 A | * | 6/1993 | Ikari et al. ................ 106/18.33 |
| 5,259,701 A | * | 11/1993 | Gerhart et al. ........... 106/15.05 |
| 5,334,389 A | * | 8/1994 | Gerhart ...................... 424/409 |
| 5,470,586 A | * | 11/1995 | Gerhart .................... 106/15.05 |
| 5,507,862 A | * | 4/1996 | Tsuboi et al. ............. 106/18.33 |
| 5,571,312 A | * | 11/1996 | Andoe ...................... 106/18.32 |
| 5,683,686 A | * | 11/1997 | Tsuboi et al. ............. 424/78.09 |
| 5,741,483 A | * | 4/1998 | Okawa .................... 424/78.09 |
| 5,773,508 A | * | 6/1998 | Tendo et al. ................. 524/547 |
| 5,990,043 A | * | 11/1999 | Kugler et al. ............... 424/405 |
| 6,010,693 A | * | 1/2000 | Tsuboi et al. ............. 106/18.32 |
| 6,060,046 A | * | 5/2000 | Steinberg et al. ......... 424/78.09 |
| 6,149,927 A | * | 11/2000 | Ghosh ........................ 424/405 |
| 6,207,290 B1 | * | 3/2001 | Blum et al. ............... 106/18.28 |
| 6,245,784 B1 | * | 6/2001 | Kugler et al. ................ 504/130 |
| 6,291,549 B1 | * | 9/2001 | Mechtel et al. ............. 523/122 |

FOREIGN PATENT DOCUMENTS

| EP | 408215 A | | 1/1991 |
|---|---|---|---|
| EP | 475781 | * | 3/1992 |
| EP | 644243 A | | 3/1995 |
| EP | 659847 A | | 6/1995 |
| EP | 676140 A | | 10/1995 |
| EP | 679333 A | | 11/1995 |
| GB | 2277742 A | | 11/1994 |
| JP | 62115072 A | | 5/1987 |
| JP | 6305913 A | | 11/1994 |
| WO | 9601294 A | | 1/1996 |
| WO | 98/17732 | * | 4/1998 |

* cited by examiner

Primary Examiner—Anthony J. Green
(74) Attorney, Agent, or Firm—Morgan, Lewis & Bockius LLP

(57) ABSTRACT

An antifouling coating composition comprising a carrier and an antifouling agent belonging to the families of isothiazolones or furanones, wherein the composition is substantially non-toxic to a cultured marine or aquatic animal when applied to the animal; and uses of the antifouling composition to reduce or inhibit fouling of marine or aquatic animals and aquaculture apparatus.

44 Claims, 12 Drawing Sheets

SEA-NINE 211™ (ROHM & HASS)

GENERAL STRUCTURE OF ISOTHIAZOLONES

GENERAL STRUCTURE OF FURANONES

ANTIFOULING OF SHELLFISH AND AQUACULTURE APPARATUS

TECHNICAL FIELD

The present invention is directed to compositions and methods of lowering the incidence of fouling of marine and aquatic animals, particularly shellfish, and apparatus used in aquaculture.

BACKGROUND ART

Shellfish aquaculture, in dollar terms, represents well over half of the Australian aquaculture industry, with pearl oysters and Sydney rock oysters the most important sectors. Total Australian market value in 1994–5 was $302 million (worldwide, an estimated $6.8 billion). As with other sectors of the aquaculture industry, biofouling—settlement and growth of unwanted marine organisms—comprises a significant cost to the industry. Unlike finfish culture, however, where fouling is a problem only for gear (ropes, pens, trays, etc.), fouling in shellfish culture is also a significant problem for the animals themselves. This is because the shells of oysters, mussels, scallops etc. are surfaces for settlement of fouling organisms.

Fouling of shellfish reduces their growth, survival, and marketability. The costs of fouling to the shellfish industry in Australia and worldwide are substantial. It has been estimated that the decline in production of Sydney rock oysters in the Port Stephens (NSW Australia) estuary from ~$20 million p.a. to $5 million p.a. over the past 10 years was due almost entirely to "overcatch" (fouling) of Pacific oysters on the shells of the cultured Sydney rock oysters, which renders them unmarketable. Moreover, the true costs of biofouling are often underestimated. For example, if biofouling could be prevented on rock oysters, they could be grown subtidally rather than intertidally. Growth would consequently be enhanced, and time to market significantly reduced. Such advantages are not usually included in costs associated with biofouling.

Currently fouling on shellfish is controlled in several ways. One way is manual cleaning, which is very inefficient and costly. For example, it is common practice for pearl oyster farmers in northern Australia to remove and clean each oyster on a farm every 7–14 days. The cost of this practice for the sector is between $8 and $20 million p.a., which represents 3–7%) of the total market value of pearls in Australia. Other methods of controlling biofouling are frequent and prolonged emersion, or even dipping briefly in near boiling water (both methods are used for Sydney rock oysters).

Current methods of controlling biofouling are clearly inefficient, costly and time consuming. The present inventors have developed a method for treating shellfish which inhibits fouling for at least 10 weeks and which has no adverse effect on survival of the treated shellfish. This is the first antifouling coating designed for application to living shellfish.

DISCLOSURE OF INVENTION

In a first aspect, the present invention consists in an antifouling coating composition when used for application to cultured marine or aquatic shellfish or aquaculture apparatus, the composition comprising a substantially non-toxic carrier selected from the group consisting of shellac, latex, casein, wax, and polymers which form hydrogels and an antifouling agent belonging to the families of isothiazolones or furanones, wherein the composition, when applied to a shellfish, is substantially non-toxic to the shellfish and reduces or prevents fouling of the shellfish.

The antifouling composition according to the present invention is considered as being non-toxic if it can be applied to the shellfish without adversely effecting the growth or survival of that shellfish during the period in which the shellfish is exposed to the composition applied thereto. The shellfish is preferably a scallop, abalone, mussel, clam, pearl oyster, or edible oyster. The furanones may be natural or modified furanones produced by marine algae or synthetically produced furanones or mixtures thereof. A mixture of synthetic furanones found to be particularly suitable is called herein 2/8/1, where 2 is (5Z)-3-butyl-4-bromo-5-(bromomethylidene)-2(5H)-furanone;

8 is 3-butyl-5-(dibromomethylidene)-2(5H)-furanone; and 1 is 3-butyl-4-bromo-5-(dibromomethylidene)-2(5H)-furanone.

The substantially non-toxic carrier can be natural, synthetic or a combination of both. It will be appreciated that the carrier should be able to stick or attach to the surface of shellfish and the like and remain substantially attached in an aqueous environment for a reasonable period of time. The carrier should also be miscible with the antifouling agent without adversely affecting the antifouling action of the agent. Natural carriers suitable include polymers which form hydrogels like Phytagel or preferably derived from shellac, a resinous excretion of the insect Laccifer (Tachardia) lacca Kerr, order Homoptera, family Coccidae ("lac" beetle secretions). Other suitable carriers include but not limited to latex or casein gel. The carrier should be substantially non-toxic to the shellfish to which the coating is applied.

Examples of suitable isothiazolones and furanones are shown in FIG. 1. Preferably, the isothiazolone antifouling agent is (4,5-dichloro-2-n-octyl-4-isothiazolin-3-one; FIG. 1) produced and sold by Rohm and Haas under the name Sea-Nine 211™.

In a preferred embodiment of the first aspect of the present invention, the antifouling agents are used at a concentration of about 1 to 40%, more preferably from about 4 to 20% (w/w) of coating. In particular, a concentration of 15% has been found to be particularly effective when used with dried "lac" beetle secretions dissolved in ethanol (from about 10 to 50% on a weight:volume basis). It will be appreciated that mixtures of antifouling agents (natural, synthetic, or commercial) may also be used to prepare the coating according to the present invention. The coating may further include other ingredients in the form of plasticisers, preservatives, solvents, organic additives and diluents, and water.

In a second aspect, the present invention consists in a method of reducing or inhibiting fouling of a cultured marine or aquatic shellfish, the method comprising treating at least part of the surface of the shellfish with an antifouling coating composition comprising a carrier and an antifouling agent belonging to the family of isothiazolones or furanones, wherein the carrier and the antifouling agent are substantially non-toxic to the shellfish.

The shellfish is preferably a scallop, abalone, pearl, mussel, clam, oyster, or edible oyster. The coating may be applied to the shellfish by any suitable means. Examples include painting, spraying, electrostatic spraying, brushing, and dipping.

In a third aspect, the present invention consists in the use of an antifouling composition according to the first aspect of the present invention to reduce or inhibit the fouling of a marine or aquatic shellfish.

In a fourth aspect, the present invention consists in method of reducing or inhibiting the fouling of an aquaculture apparatus, the method comprising treating at least part of the surface of the aquaculture apparatus with an antifouling coating composition according to the first aspect of the present invention.

The aquaculture apparatus suitable for treatment may be any apparatus used in mariculture and aquaculture industries. Examples include netting, mesh, panels, trays, ropes, floats, pumps, and monitoring equipment. The coating may be applied to the apparatus by any suitable means. Examples include painting, spraying, electrostatic spraying, brushing, and dipping.

The advantage of this aspect of the present invention is that the composition used adds significantly less weight to the treated apparatus and is not toxic to marine and aquatic animals in use. Traditional use of conventional antifouling compositions which include heavy metals for example have been found to be unsatisfactory due to the weight added to the apparatus as well as being potentially toxic to the marine organisms grown in the particular aquaculture.

In a fifth aspect, the present invention consists in the use of an antifouling composition according to the first aspect of the present invention to reduce or inhibit the fouling of aquaculture apparatus.

Throughout this specification, unless the context requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps.

In order that the present invention may be more clearly understood, preferred forms will be described with reference to the accompanying drawings and examples.

BRIEF DESCRIPTION OF DRAWINGS

FIG. 1 shows examples of suitable isothiazolones and furanones for the present invention.

MODES FOR CARRYING OUT THE INVENTION

Jervis Bay Tests

Methods

Figure 1A:
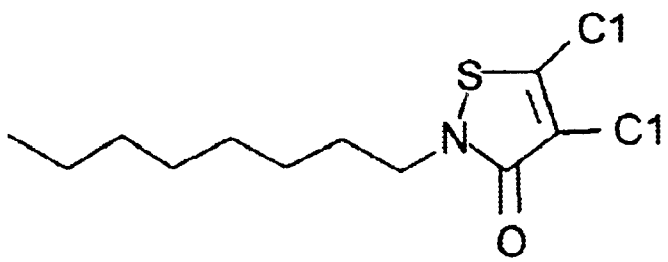
FIG. 1A represents 4,5-dichloro-2-n-octyl-4-isothiazolin-3-one, a preferred isothiazolone produced by Rohm and Haas under name Sea-Nine 211™.
Figure 1B:
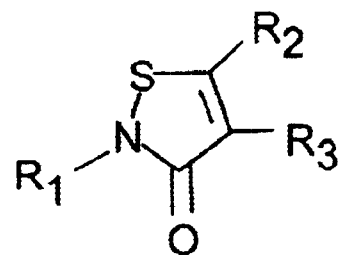
In FIG. 1B (isothiazolones), $R_1$, $R_2$ and $R_3$ are either a hydrogen atom, methyl, alkyl, hydroxyl, ether, halogen, sulphur, nitrogen or a combination thereof.
Figure 1C:
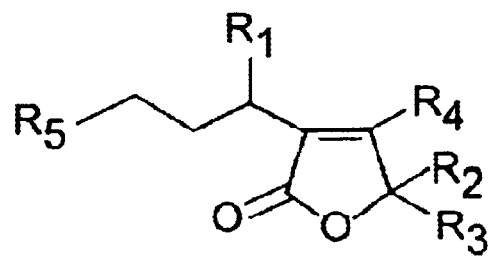
In FIG. 1C (furanones), $R_1$, $R_2$ and $R_3$ are either a hydrogen atom, a hydroxyl group, an alkyl group, an ester group, or a halogenated alkene, or $R_1$ and $R_2$ together are an unsubstituted or a halogenated alkene; $R_4$ is a hydrogen or a halogen atom; and $R_5$ is a hydrogen or an alkyl group.

Test coatings consisted of shellac, as used ill furniture waxes and polishes, incorporating all active antifouling ingredient. In the examples described below the active ingredient is Sea-Nine 211™, an isothiazolone antifouling compound sold by Rohni & Haas. However, a variety of active ingredients could be incorporated into the shellac, including other isothiazolone type compounds, natural antifouling metabolites such as halogenated furanones, or other biocides. The isothiazolones and furanones covered in this specification are shown in FIG. 1. There are many variations on shellac, all of which, however, are derived from the bodily secretions of the "lac" beetle. In the present formulations, the dried beetle secretions are dissolved on ethanol (25:75 on a weight:volume basis), the active ingredient incorporated (@15% w:v), and the resulting solution applied to the surface of the animals either by painting (as described below), spraying, or dipping.

Shellfish Trials

Field trials with two shellfish are described below: living scallops (*Pecten fumatus*), aid pearl oyster (*Pinctada maxima*) shells.

Live Scallop Coating Experiment

Materials and Methods

Field tests on fouling of the edible scallop *Pecten fumatus* were carried out at the NSW Fisheries research scallop aquaculture facility in Jervis Bay, NSW, Australia. Three treatments were used on the trials.

1) Control scallops (untreated)
2) Scallops coated only on shellac (designated as "carrier" in the relevant figures): and
3) Scallops coated on carrier plus the active ingredient Sea-Nine 211™ (designated as AI)

Fifteen scallops were used for each treatment. The scallops ranged in size from 1 to 3 cm shell width.

The coating control (carrier [shellac] only) and active ingredient treatments were coated onto the scallops using a paint brush. The scallops were left to air dry for two minutes before being placed into pearl nets and resuspended on the water. Control scallops were exposed to the same coating and drying conditions as coating controls and the active ingredient treatment.

Field Placement

Cages were hung off the long line on Jervis Bay, NSW, Australia. The cages were hung off one line between a depth of 3 to 6 metres. The experiment remained submerged for eight weeks after which time the scallops were removed and survival of scallops and fouling on individual valves of each scallop (cupped & flat) quantified.

Measurement of Fouling on Scallop Shells

Fouling was quantified using a standard point intercept method. A 0.5×0.5 cm grid was placed over the shell, and the presence and type of fouling organisms counted. Results are presented as percent cover of fouling organisms on the shells. The two halves of each scallop were analysed separately as "cupped" and "flat" valves. However as in most cases there was no difference in fouling for the cupped and flat valves the results for individual fouling organisms were combined. Mortality of scallops was also recorded. The resulting data were analysed by analysis of variance (ANOVA) followed by Tukey's multiple comparison test. Data were analysed after arcsin transformations where applicable.

Results

Total Fouling

Figure 2:
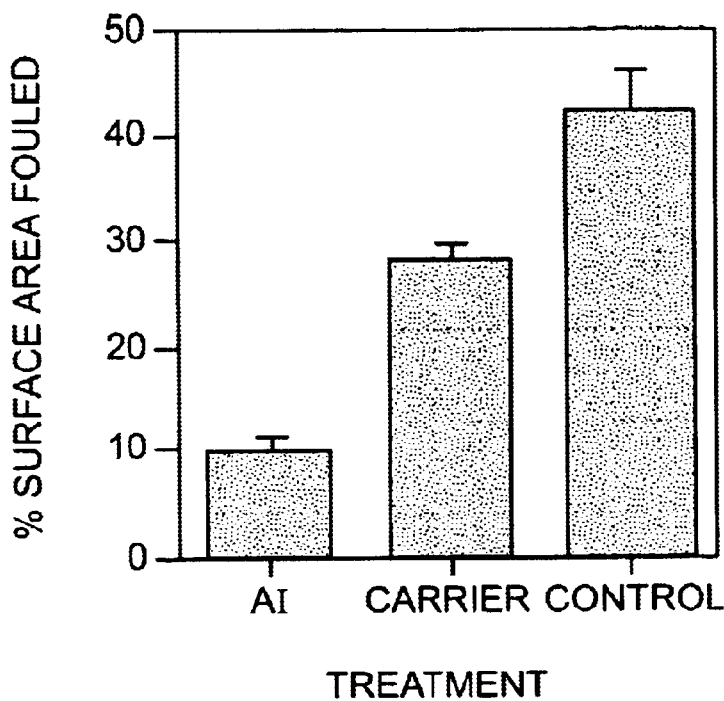
FIG. 2 shows the percent surface area of scallop shells covered by all fouling organisms (data are means±SE). Experimental treatments in FIG. 2 (and FIGS. 3–6) are AI=scallops coated with shellac and Sea-nine 211, carrier= shellac only, and control=uncoated.

Treating scallops with shellac and Sea-Nine 211™ (AI in FIG. 2) strongly deterred the settlement and growth of fouling organisms (single factor ANOVA. p=0.0001: FIG. 2; Plates 1–3). Mean percentage coverage of whole scallop shells was 10% for treated shells compared with 43% for untreated controls. The coating control ("carrier") scallops were also significantly less fouled (28%) than control shells, demonstrating that shellac alone had significant antifouling activity (FIG. 2). Mortality only occurred for control scallops, where two of fifteen scallops died (13%).

Figure 3:
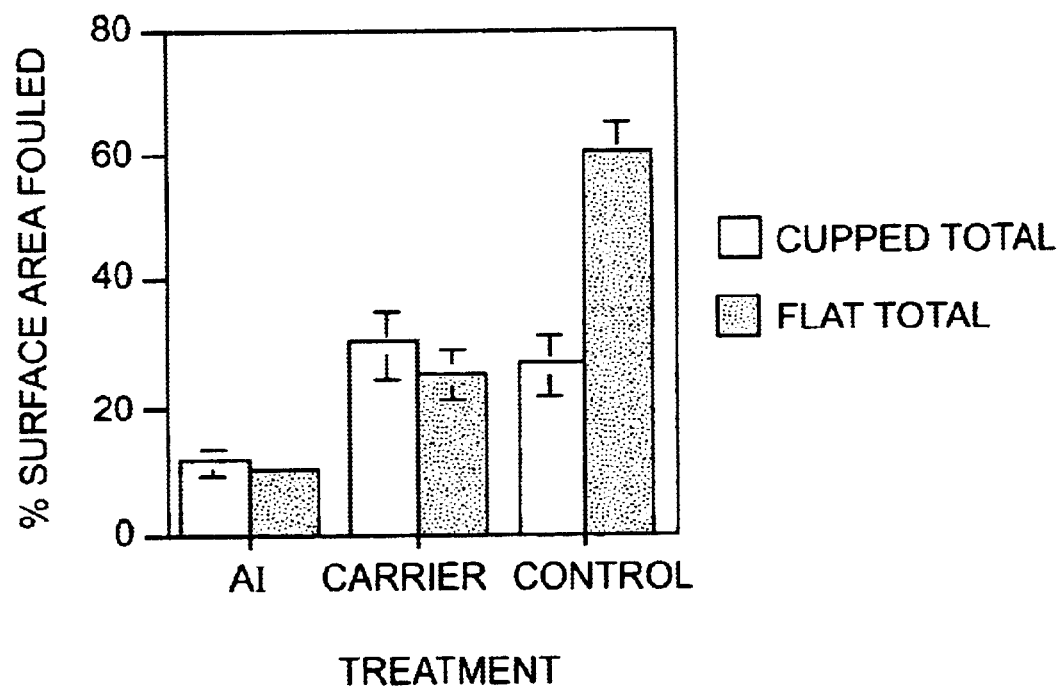
FIG. 3 shows the percent surface of the cupped and flat valves of scallop shells covered by all fouling organisms (data are means±SE).

There were significant differences in the fouling community of cupped vs. flat valves for control scallops (p=0.0001) but not on scallops which had been treated either with shellac or with shellac+Sea-Nine 211™ (FIG. 3). While the distribution of fouling organisms was not a primary goal of the trials, the difference in settlement of fouling organisms on different parts of the shell may be of importance in designing appropriate antifouling formulations. Therefore, results for total fouling are presented for both cupped and flat valves, but results for individual species are presented as combined data for both valves of the scallops.

Inhibition of Individual Taxa of Fouling Organisms

The major fouling organisms of whole scallops ranked in order of percent coverage of scallop shell, were, oysters (*Ostrea angasi*), bryozoans (Membranipora sp. and others), and sponges. Tubeworms, the bivalve *Electroma georgiana*, and barnacles were also present, but in very low abundance, and were not considered further.

Oysters

Figure 4:
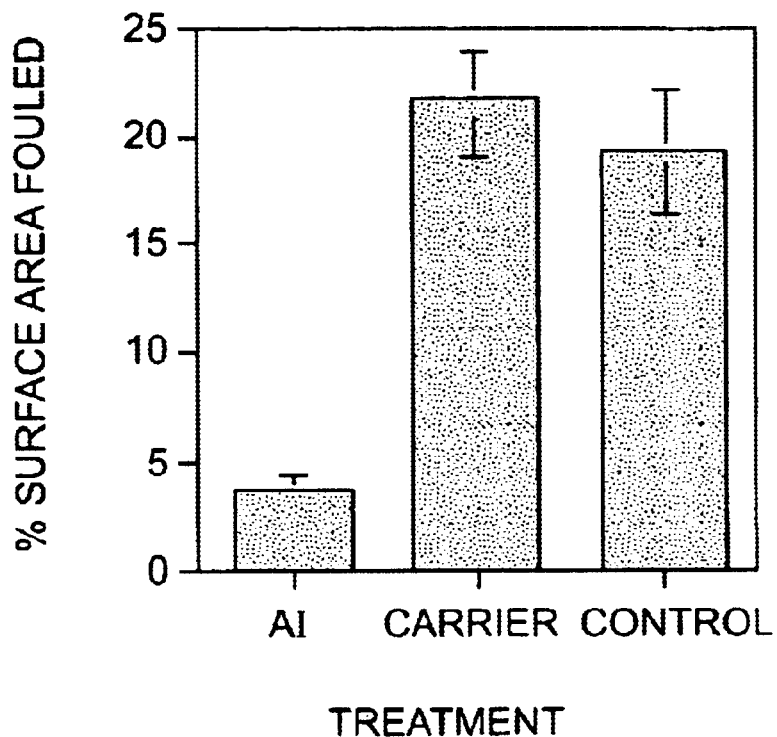
FIG. 4 shows the percent surface area of scallop shells covered by oysters (data are means±SE).

Oysters were the most abundant fouling organism. There was a significant effect of treatment of oysters on % coverage (single factor ANOVA. p=0.0001). The AI (Shellac+Sea-Ninie 211™) treatment was significantly more deterrent than the carrier treatment or the control, which were not different from each other (Tukey's test α=0.05). Mean percentage coverage of oysters for the AI treatment shells was 4% compared with 22% for the carrier alone, and 19% for control scallops. (FIG. 4)

Bryozoans

Figure 5:
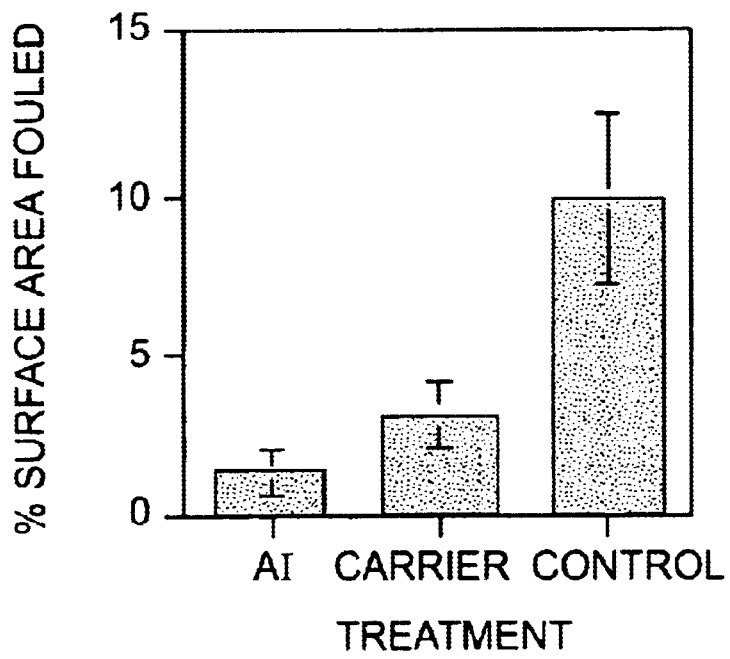
FIG. 5 shows the percent surface area of scallops shells covered by bryozoans (data are means±SE).

Bryozoans, in particular encrusting species, were the next most common major fouling organism. The treatments had a significant effect on % coverage (single factor ANOVA. p=0.0001). However, in contrast to the oyster, both the carrier (shellac by itself) and the AI treatment significantly deterred fouling and there was no significant difference between the two treatments (Tukey's test α=0.05). Mean percentage coverage for AI treatment shells was 1% compared with 3% for the carrier and 10% for control scallops. (FIG. 5)

Sponges

Figure 6:
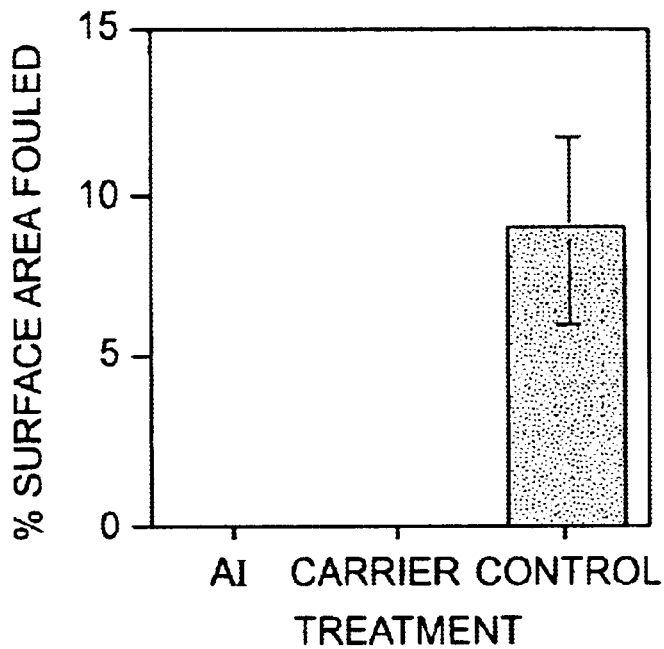
FIG. 6 shows the percent surface area of scallop shells covered by sponges (data are means±SE).

The third most common fouling organism was sponges. Again the treatments had a significant effect on % coverage (single factor ANOVA, p=0.0001) and as was the case for bryozoans both the carrier and the AI treatment significantly deterred fouling without a significant difference between the two treatments (Tukey's test α=0.05). In fact both treatments completely inhibited the settlement of sponges while the control shells had a mean coverage of 9% of shell area. (FIG. 6)

Darling Harbour Pearl Oyster Shell Tests

Methods and Results

Figure 7:
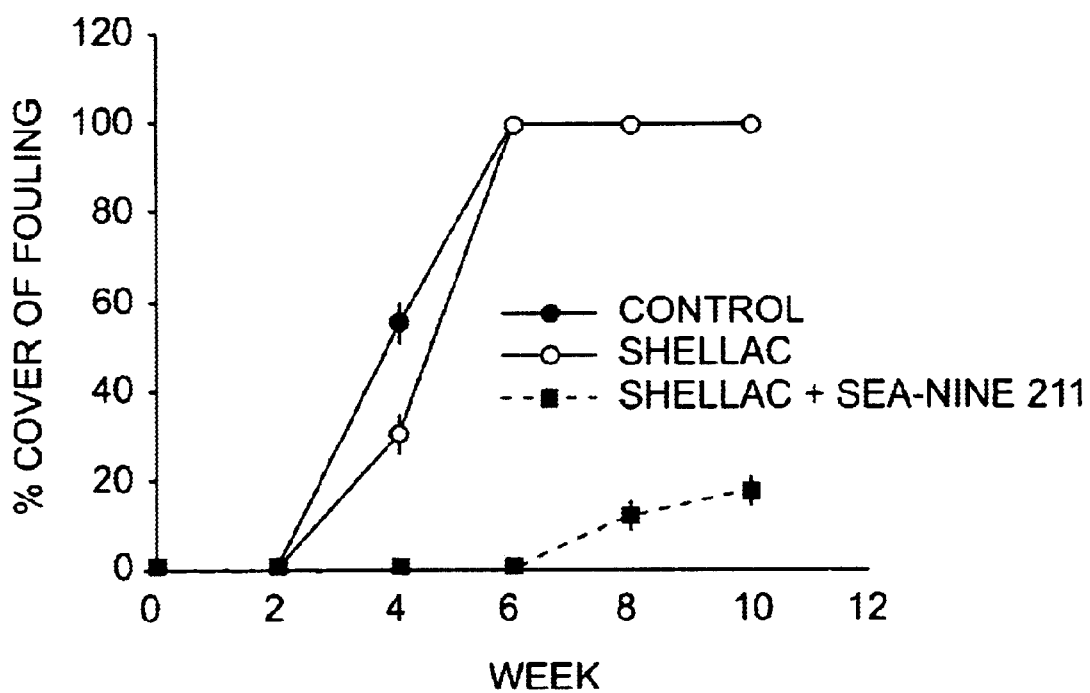
FIG. 7 shows the percent cover of fouling organisms on pearl oyster shells over ten weeks (data are means±SE).

Shells of pearl oysters were coated as described above in either shellac, or shellac incorporating 15% v:v Sea-Nine 211™. Control shells were untreated. Three shells per treatment were used in the trial. The shells were placed in submerged trays in Darling Harbour, Sydney, NSW, Australia and fouling monitored via weekly photographs. Percent cover of fouling organisms was then estimated from the photographs by the point intercept method. As is seen below in FIG. 7, shellac+Sea-Nine 211™ significantly inhibited fouling of the shells for 10 weeks (the duration of the trial). Fouling on control shells, and those treated with shellac only, reached 100% cover within 6 weeks. In contrast, shells with Shellac+Sea-Nine 211™ only had a mean of 18% cover after 10 weeks. Moreover, fouling on treated shells was mostly restricted to one shell, suggesting that coating of that shell may have not been properly done. Fouling organisms were primarily algae and diatoms.

SUMMARY

The present inventors have shown that coating scallops or oysters with shellac containing Sea-Nine 211™ significantly inhibits fouling of shellfish for 8–10 weeks. In some instances, particularly against some invertebrates, shellac by itself significantly inhibited fouling. Given current farming practices in shellfish aquaculture, and the fact that reasonably frequent recoating of the animals would be necessary as they grow, this length of time is probably appropriate for this application. Moreover, given the low price of shellac and Sea-Nine 211™, these coatings have considerable commercial potential.

Field Biofouling Trials of Antifouling Coatings on Live Oysters at Port Stephens Methods and Results Stage I Trial The field trial testing the antifouling coatings on oysters at the Port Stephens Fisheries Centre was finalised on week 22 of the trial. This coincided with the slight increase, at varying rates, of the fouling cover on the treated oysters, as shown by FIG. 8.

The trial was testing the antifouling efficacy of two different active ingredients (AI's). Sea-Nine 211™ and the furanone 281, incorporated into carrier coatings when applied to live oysters. The AI's are being tested at concentrations ranging from 10–15% by weight of the carrier coating, using both single and double coats. The trial was conducted in both the inter-tidal and the sub-tidal. In addition to monitoring fouling, oyster mortality was monitored to determine if the coatings and methods used were harmful to the oysters.

Fouling cover was first measured 6 weeks after the start of the trial and has been measured every 3 weeks thereafter. Coated oysters were photographed in the field using a digital camera and fouling cover was measured in the laboratory using the digital images. Fouling cover was measured by estimating the percentage cover of fouling organisms on the oysters. The fouling cover observed was comprised predominantly of barnacles and a small percentages of bryozoans and oysters.

Figure 8:
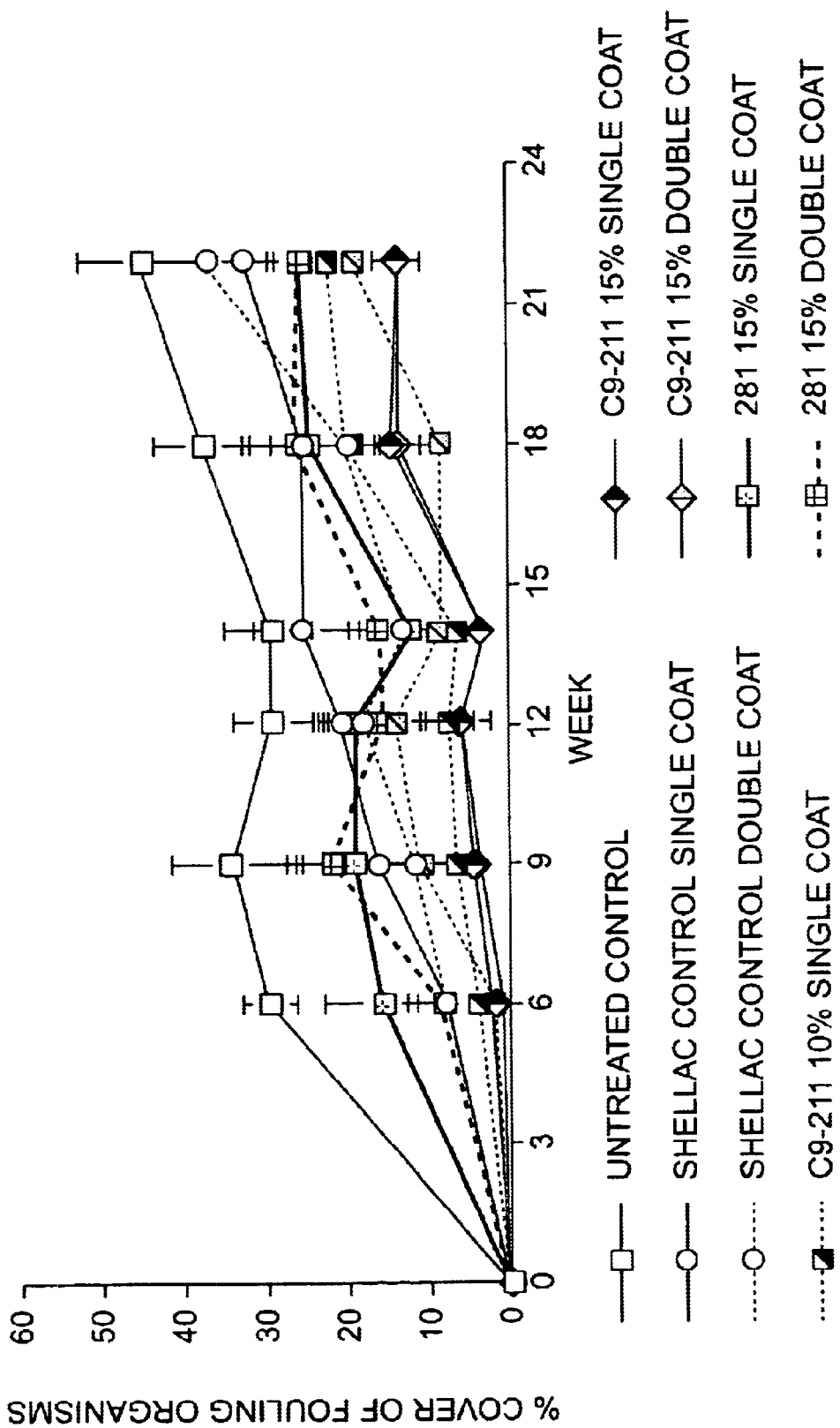
FIG. 8 shows the percentage cover (means and S.E.) of fouling on coated oysters in the subtidal at Port Stephens over time.

The treatments with the highest antifouling efficacy compared to controls, with a mean fouling cover of 15% (this translates to 85% inhibition of fouling cover) in this trial were Sea-Nine 211™ 15% single and double coats (FIG. 8). Sea Nine-211 10% single and double coatings also significantly inhibited the development of fouling with a mean fouling cover of 20%. This compares favourably with the untreated control which shows a mean fouling cover of 50% and the shellac controls with a 35–40% fouling cover (FIG. 8). The furanone s2/8/1 15% were as effective with a fouling cover approaching 25%, for both the single and double coatings (a 50% reduction compared to the untreated control as seen in FIG. 8).

Overall, there was little fouling in the inter-tidal region. All but one treatment had a mean percentage cover of fouling at or less than 5% after 12 weeks. After 22 weeks the fouling cover has reached a maximum fouling cover of 8% for the controls and less than 5% for the treatments.

Figure 9:
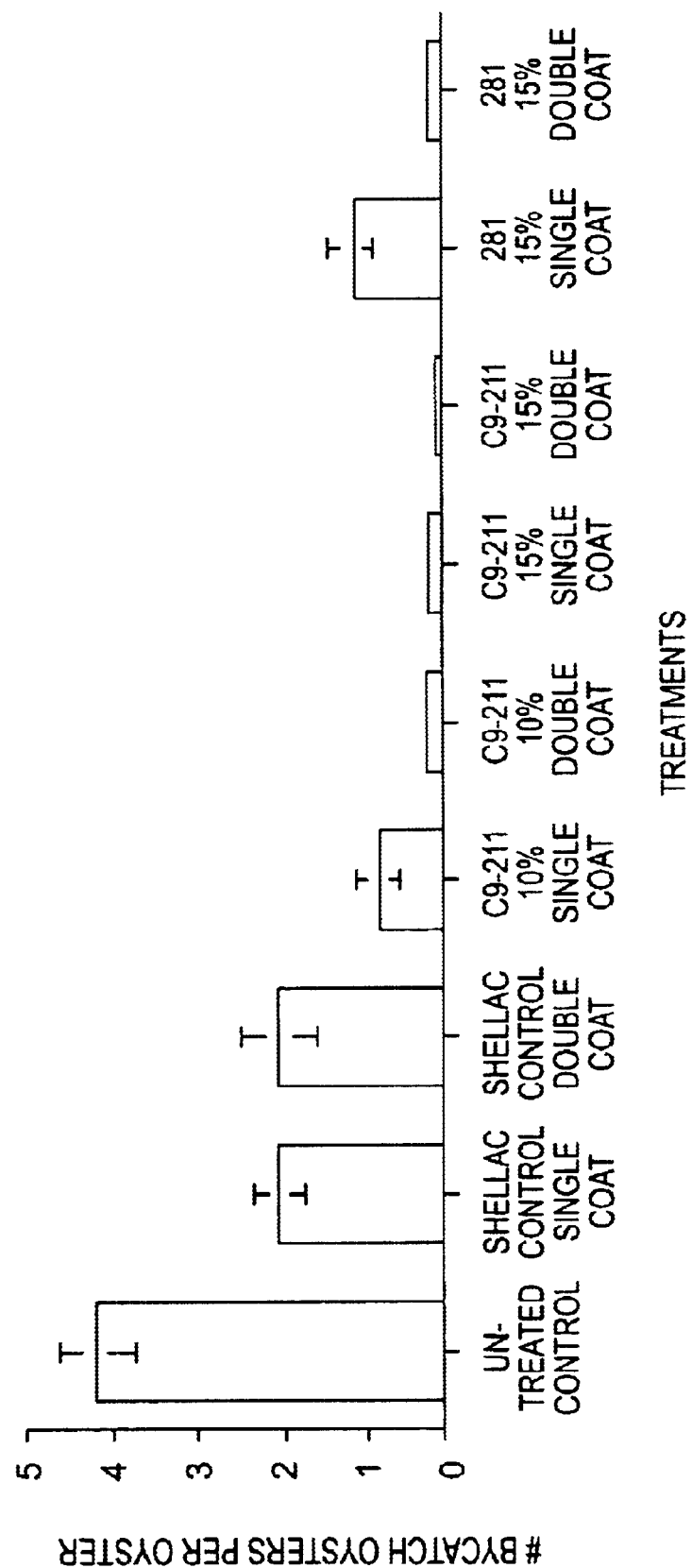
FIG. 9 shows number of bycatch oysters (means and S.E.) settled on coated oysters in the subtidal at Port Stephens after 18 weeks.

After twelve weeks into the fouling trial there was a Pacific oyster settlement event. This enabled an observation of the efficacy of the different coatings as inhibitors of oyster bycatch. FIG. 9 presents the number of new Pacific oyster recruits that settled on the coated oysters. All of the treatment oysters, including coating alone, strongly inhibited bycatch. The double coated treatments containing both Sea-Nine 911™ or the furanones 2/8/1 (at either 10 or 15%) were the most effective, almost totally inhibiting bycatch.

An experiment to determine the effect of coating oil oyster mortality was started. In this experiment, 10 oysters of each treatment were tagged and coated and placed in the subtidal and mortality and fouling monitored. After 2 weeks only 4 oysters out of a total of 120 had died and after 13 weeks only 7 had died. These dead oysters were spread across a number of different treatments, including the untreated control which demonstrates that the mortality is not a result of the coatings procedure or the active ingredients.

Stage II Trial

The shellac trial (stage II) was run for 30 weeks. This experiment was conducted to improve novel antifouling techniques for the aquaculture industry. Shellac was used as a carrier to coat Sea-Nine 211™ onto perspex tiles to determine whether Shellac with C9-211 was effective as an antifouling application and whether the rate at which Sea-Nine 211™ would leach out of the shellac formulation.

Figure 10:
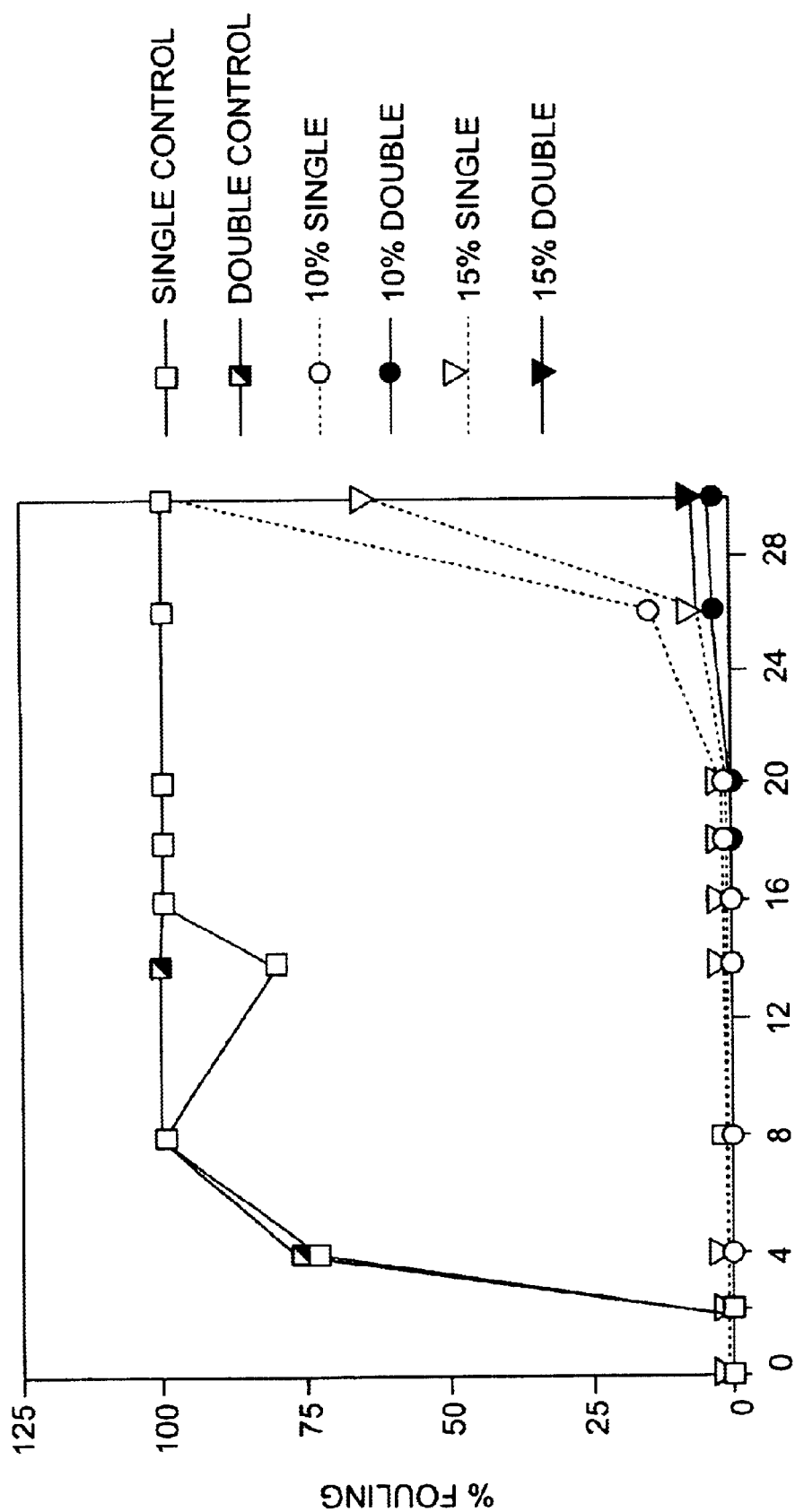
FIG. 10 shows fouling on tiles showing antifouling activity up to 30 weeks.

The results of the treatments to fouling inhibition are shown in FIG. 10. The three most effective treatments (10% double layer, and both 15% single and double layers) remained unfouled for 30 weeks. This compares to a 75% fouling cover on both single and double controls, after only 4 weeks.

Figure 11:
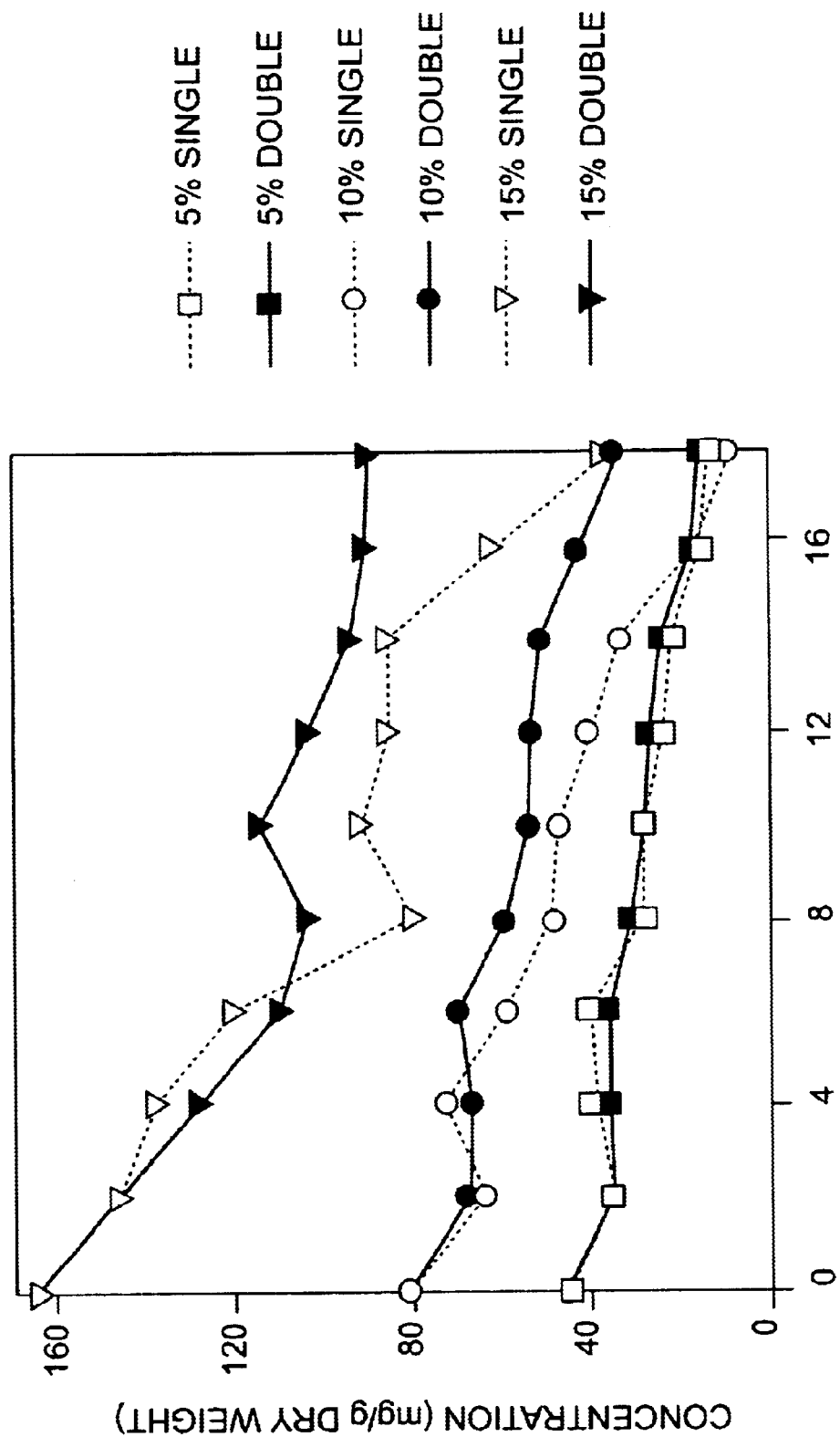
FIG. 11 shows leaching of Sea-Nine 211™ from shellac from weeks 0–18.

Measurements of leaching were carried out to determine the decrease in concentration of Sea-Nine 211™ in each treatment, as shown on FIG. 11. This indicates a regular rate of leaching over the 18 week trial period for each treatment of the same concentration. The rate of leaching is highest for the 15% Sea-Nine 211™ loadings (single and double), while decreasing with reduced compound loading.

Figure 12:
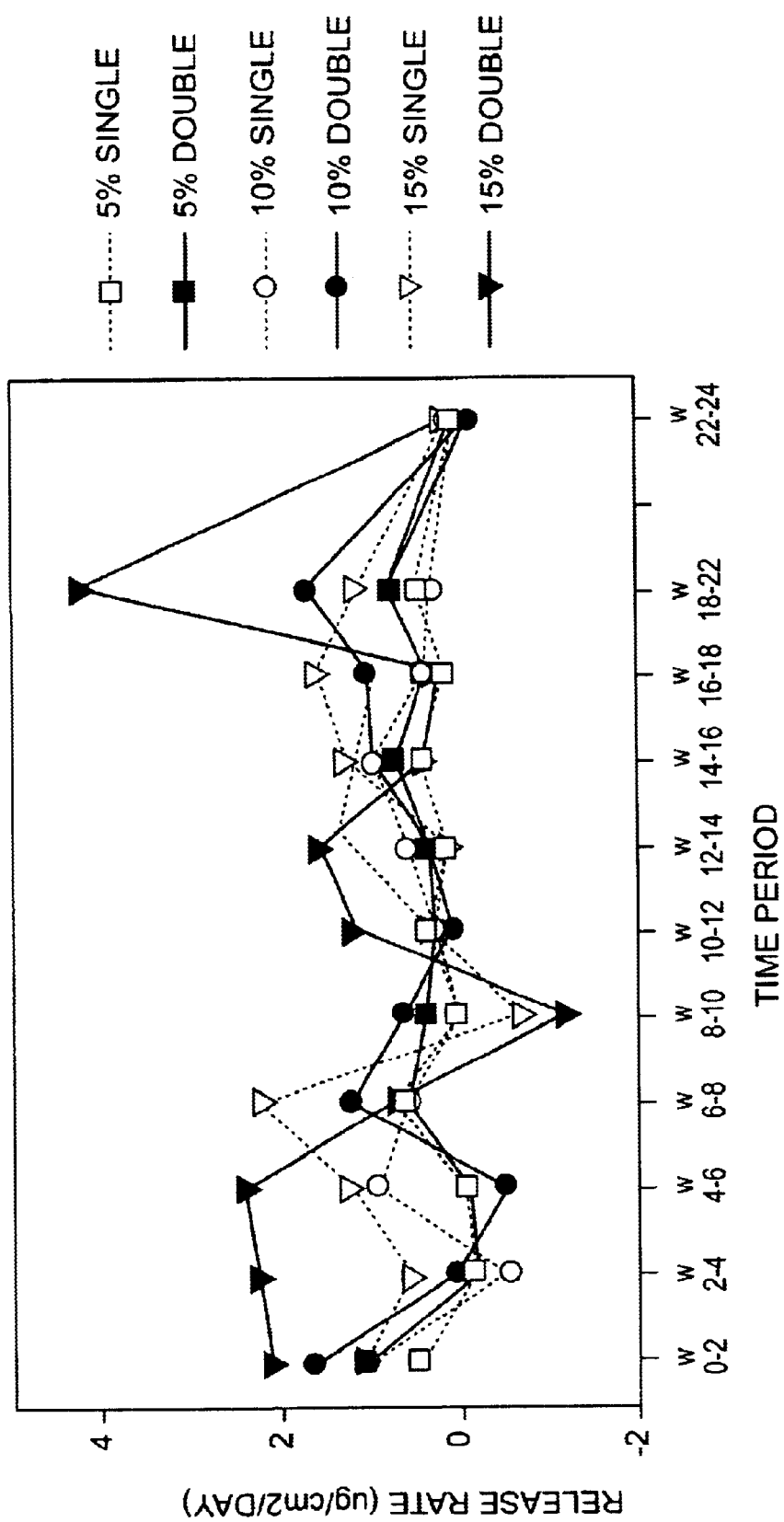
FIG. 12 shows release rates of Sea-Nine 211™ from shellac.

The rate of compound release per day is important on determining the effectiveness of a given treatment over time (FIG. 12). Treatments 5% single layer, 10% single and double layer and 15% double layer had the highest initial drops with release rates from 1–2 $\mu g/cm^2/day$. The release rate varied for each treatment, over the following 16 weeks, but remained less than 2.0 $\mu g/cm^2/day$ (FIG. 12).

Shellac Coatings for Fish-Cage Netting—
Tasmanian Field Trial

Methods

Design of Field Trial

Forty-eight panels were immersed to evaluate the antifouling efficacy of shellac-based coatings on netting. The panels were immersed at 2.5 m depth and each contained a 50 cm×50 cm section of netting. Panels were attached at randomly-chosen positions to three 8 m beams of a large frame (each beam was parallel and separated by 2 m). The frame was tethered within a salmon-cage collar and panels were positioned perpendicular to the current flow.

Fouling was compared between uncoated netting, netting coated with shellac only (no added antifoulant), and netting coated with shellac that contained Sea-Nine 211™. Several formulations of shellac and sizes of netting mesh were tested, to give a total of 16 treatments (Table 1). For each treatment three replicate panels were immersed.

Preparation and Application of Coatings

Shellac coatings were formulated according to Table 2. Nets were coated by complete immersion of the netting pieces and constant agitation for at least 2 minutes. Nets were air-dried for 48 hours prior to attachment to the test panels. The change on netting weight, from before to after coating, was also determined.

Quantification of Fouling on Test Panels

Close-up underwater photographs of each panel were taken 4 weeks immersion and 10 weeks immersion. Photographs were taken using a Nikonos-V camera with two SB-103 strobes, a Nikonos close-up outfit (1:4.5) and 100 ASA film.

The level of mesh blockage on each sampling occasion was quantified by image analysis of the photographs. During photography, a blue sheet was suspended behind the panels to provide a background of high contrast with the fouling and netting. All photographs were scanned into an IBM-pc computer and then analysed using the image-processing software IDRISI (V. 4.1). Image analysis was used to quanitify the area of blue, and thus the open area of the netting mesh, in each photograph.

Results

Rate of Fouling Development

Figure 13:
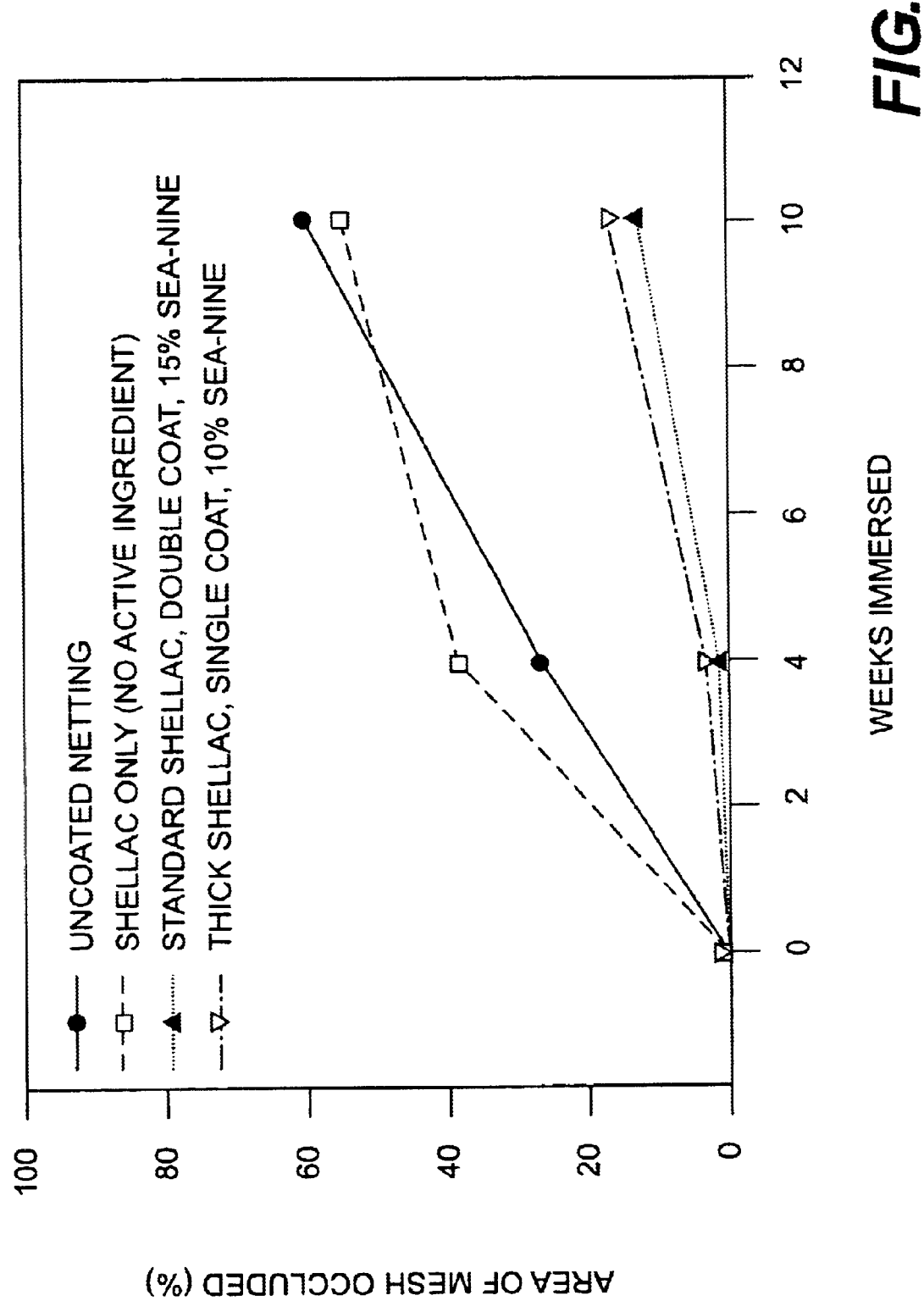
FIG. 13 shows levels of mesh occlusion on panels of 33 mm salmon-cage netting where each point is a mean of 3 samples.
Figure 14:
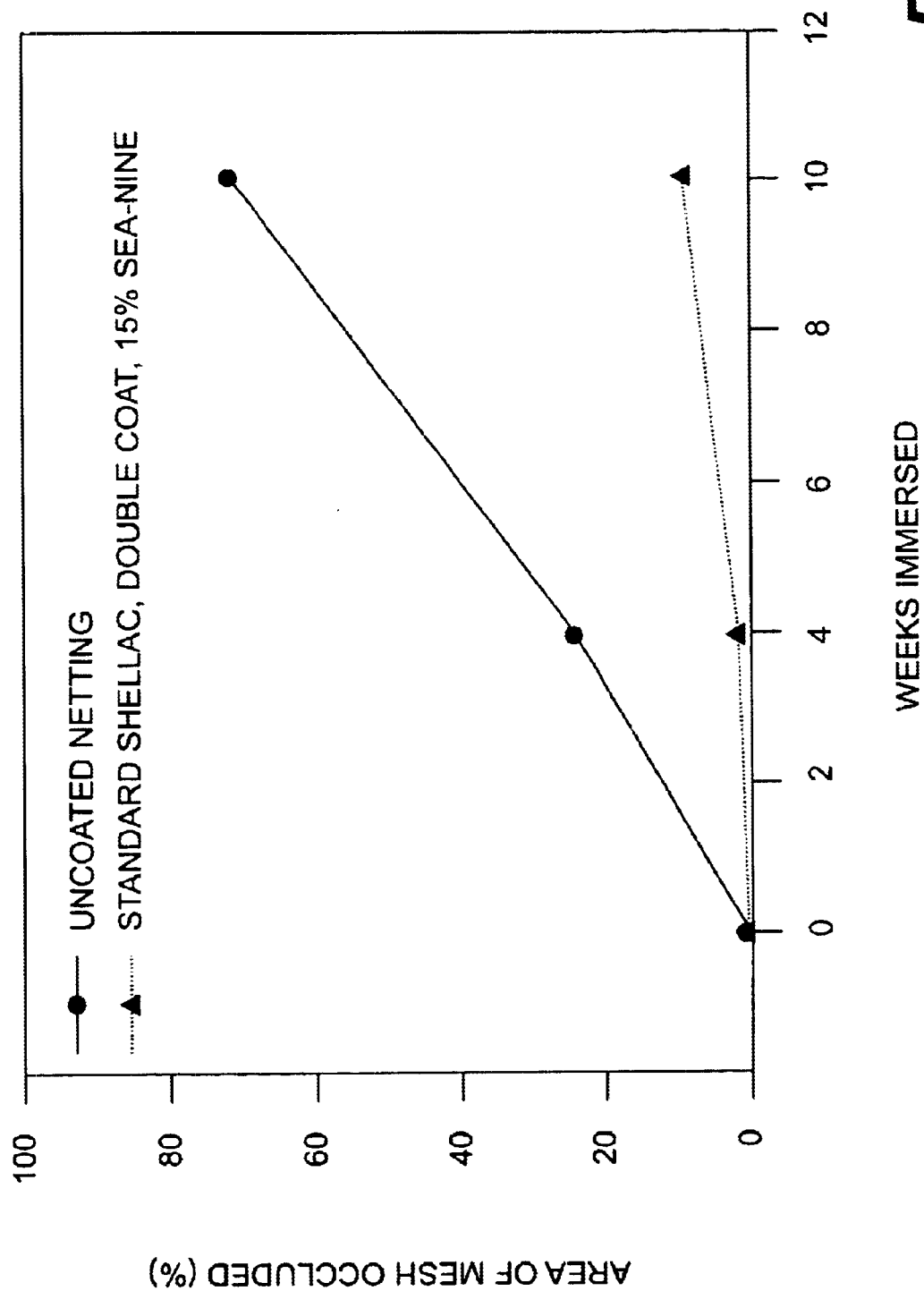
FIG. 14 shows levels of mesh occlusion on panels of 60 mm tuna-cage netting where each point is a mean of 3 samples.
Figure 15:
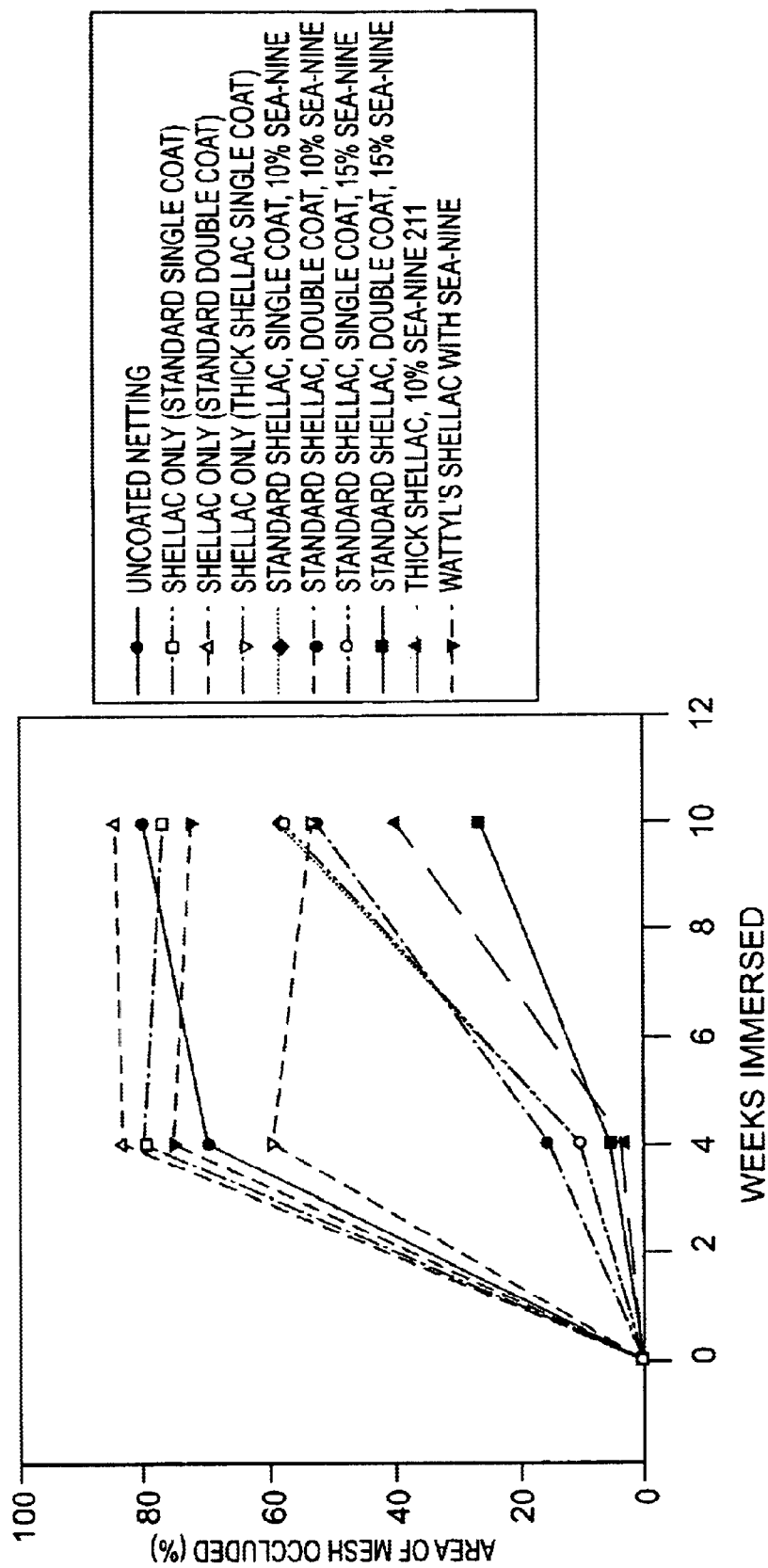
FIG. 15 shows levels of mesh occlusion on panels of 12 mm salmon-cage netting where each point is a mean of 3 samples.

Fouling developed rapidly on all uncoated netting and all netting coated with shellac only (no antifoulant added) (FIGS. 13, 14, 15). After 4 weeks the smaller meshes were more than 70% occluded and the larger meshes more than 20% occluded. After 10 weeks, the smaller meshes remained 70% occluded, but occlusion of the larger meshes increased to more than 60%. Smaller meshes are generally occluded more rapidly because of the larger surface area available for attachment of fouling.

Inhibitory Effect of Shellac with Sea-Nine 211™

All shellac coatings that contained Sea-Nine 211™ caused a significant reduction in mesh occlusion. On the larger meshes, less than 5% of the netting was occluded after 4 weeks. After 10 weeks, less than 20% of the 33 mm mesh was occluded and less than 10% of the 60 mm mesh was occluded. The better coatings on the 12 mm mesh limited occlusion to less than 5% after 4 weeks and less than 30% after 10 weeks.

Optimum Coating Design

A range of shellac-based coatings was evaluated on the 12 mm mesh. The most effective was the standard shellac double-coat that contained 15% Sea-Nine 211™. The second most effective was the thick shellac that contained 10% Sea-Nine 211™. No distinction could be made between the other Sea-Nine 211™ coatings, which were all less effective than the two aforementioned treatments (FIG. 15).

Changes for Netting Weight After Coating With Shellac

For 12mm salmon-cage netting a single coat of the standard shellac increases net weight by about 20%.

For 12 mm salmon-cage netting a double coat of the standard shellac increases net weight by about 45%.

For 33 mm salmon-cage netting a single coat of the standard shellac increases net weight by about 30%.

SUMMARY

Preliminary results show that shellac with Sea-Nine 211™ significantly reduced fouling of fish-cage netting. After 10 weeks immersion, coated 60 mm tuna-cage netting was only 10% occluded whereas uncoated netting was 70% occluded. After the same period, coated 33 mm salmon-cage netting was less than 20% occluded whereas uncoated netting was 60% occluded.

Of the range of coatings evaluated, two were shown to be superior (in terms of fouling inhibition): (1) standard shellac double-coat with 15% sea-nine 211, and (2) thick shellac single-coat with 10% sea-nine 211.

A single coating of shellac-based antifouling composition increased the weight of 12 mm netting by 20% and 33 mm netting by 30%. This is significantly lower than copper-based antifoulants that typically increase net weight by 100%.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

TABLE 1

Treatments used for the evaluation of the antifouling coatings.

| 12 mm salmon-cage netting | 33 mm salmon-cage netting | 60 mm salmon-cage netting |
|---|---|---|
| 1) uncoated control netting | 1) uncoated control netting | 1) uncoated control netting |
| 2) standard shellac control, single coat | 2) standard shellac control, double coat | 2) standard shellac double coat, 15% Sea-Nine 211 ™ |
| 3) standard shellac control, double coat | 3) thick shellac, single coat, 10% Sea-Nine 211 ™ | |
| 4) thick shellac control, single coat | 4) standard shellac double coat, 15% Sea-Nine 211 ™ | |
| 5) standard shellac single coat, 10% Sea-Nine 211 ™ | | |
| 6) standard shellac double coat, 10% Sea-Nine 211 ™ | | |
| 7) standard shellac single coat, 15% Sea-Nine 211 ™ | | |
| 8) standard shellac double coat, 15% Sea-Nine 211 ™ | | |
| 9) thick shellac single coat, 10% Sea-Nine 211 ™ | | |
| 10) Wattyl ™ shellac | | |

TABLE 2

Formulation for shellac coatings.

| Coating description | Preparation method |
|---|---|
| (1) standard shellac control | Dissolve 400 g of shellac into 2000 ml of AR grade ethanol in a glass container (approximately 1 hour). |
| (2) thick shellac control | Dissolve 800 g of shellac into 2000 ml of AR grade ethanol in a glass container (approximately 1 hour). |
| (3) 10% Sea-Nine 211 ™ in standard shellac | Dissolve 400 g of shellac into 1200 ml of AR grade ethanol in a glass container (approximately 1 hour). In a separate glass container, dissolve 40 g of 15% Sea-Nine 211 ™ into 800 ml of AR grade ethanol. Mix the two solutions thoroughly |
| (4) 15% Sea-Nine 211 ™ in standard shellac | Dissolve 100 g of shellac into 1200 ml of AR grade ethanol in a glass container (approximately 1 hour). In a separate glass container, dissolve 60 g of 15% Sea-Nine 211 ™ into 800 ml of AR grade ethanol. Mix the two solutions thoroughly |
| (5) 10% Sea-Nine 211 ™ in thick shellac | Dissolve 300 g of shellac into 1500 ml of AR grade ethanol in a glass container (approximately 1 hour). In a separate glass container, dissolve 80 g of 15% Sea-Nine 211 ™ into 500 ml of AR grade ethanol. Mix the two solutions thoroughly |

TABLE 3

Change in net weight after coating with shellac.

| Net type | Sample size | Coating | Weight before coating | Weight after coating | Weight change | Percent change |
|---|---|---|---|---|---|---|
| Smolt (12 mm bar)[b] | 1 m² | standard single coat | 461.43 g | 561.1 g | 99.67 g | 21.6% |
| Smolt (12 mm bar)[b] | 1 m² | standard single coat | 448.27 g | 536.2 g | 87.93 g | 19.6% |
| Smolt (12 mm bar) | 1 m² | standard double coat | 461.76 g | 677.8 g | 216.4 g | 46.8% |
| Growout (33 mm bar) | 0.75 m | standard single coat | 274.06 g | 351.5 g | 77.47 g | 28.3% |

[a]weight/change/weight before coating/100
[b]the first two samples are duplicates (NB very little variation between the two)

What is claimed is:

1. An antifouling coating composition used for application to a cultured marine or aquatic shellfish or an aquaculture apparatus, the composition comprising:
    a non-toxic carrier selected from the group consisting of shellac, latex, casein, wax, and hydrogel polymers and
    an effective amount of at least one antifouling agent selected from the group consisting of isothiazolones and furanones,
    wherein the composition, when applied to a shellfish, is non-toxic to the shellfish and reduces or prevents fouling of the shellfish.

2. The composition according to claim 1, wherein the shellfish is selected from the group consisting of scallop, abalone, mussel, clam, pearl oyster, and edible oyster.

3. The composition according to claim 1, wherein the aquaculture apparatus is selected from the group consisting of netting, mesh, panels, trays, ropes, floats, pumps, and monitoring equipment.

4. The composition according to claim 1, wherein the carrier is latex.

5. The composition according to claim 1, wherein the carrier is shellac.

6. The composition according to claim 5, wherein the carrier is shellac mixed with ethanol comprising shellac at a concentration from 10 to 50% (w/v).

7. The composition according to claim 1, wherein the carrier is wax.

8. The composition according to claim 1, wherein the isothiazolone is 4,5-dichloro-n-octyl-4-isothiazolin-3-one.

9. The composition according to claim 1, wherein the antifouling agent is a mixture of (5Z)-3-butyl-4-bromo-5-(bromomethylidene)-2(5H)-furanone; 3-butyl-5-(dibromomethylidene)-2(5H)-furanone; and 3-butyl-4-bromo-5-(dibromomethylidene)-2(5H)-furanone.

10. The composition according to claim 1, wherein the antifouling agent is used at a concentration of 1 to 40% (w/w) of the coating composition.

11. The composition according to claim 10, wherein the antifouling agent is used at a concentration from 4 to 20% (w/w) of the coating composition.

12. The composition according to claims 11, wherein the antifouling agent is used at a concentration of 15% (w/w) of the coating composition.

13. The composition according to claim 1 further comprising at least one component selected from the group consisting of plasticisers, preservatives, solvents, diluents, and water.

14. A method of reducing or inhibiting fouling of a cultured marine or aquatic shellfish, the method comprising treating at least part of a surface of the shellfish with an antifouling coating composition comprising:
    a non-toxic carrier and
    an effective amount of at least one antifouling agent selected from the group consisting of isothiazolones and furanones,
    wherein the composition, when applied to the shellfish, is non-toxic to the shellfish and reduces or prevents fouling of the shellfish.

15. The method according to claim 14, wherein the shellfish is selected from the group consisting of scallop, abalone, mussel, clam, pearl oyster, and edible oyster.

16. The method according to claim 14, wherein the non-toxic carrier is natural, synthetic or a combination thereof.

17. The method according to claim 16, wherein the carrier is selected from the group consisting of shellac, latex, casein, wax, and hydrogel polymers.

18. The method according to claim 17, wherein the carrier is latex.

19. The method according to claim 17, wherein the carrier is shellac.

20. The method according to claim 19, wherein the carrier is shellac mixed with ethanol comprising shellac at a concentration from 10 to 50% (w/v).

21. The method according to claim 17, wherein the carrier is wax.

22. The method according to claim 14, wherein the isothiazolone is 4,5-dichloro-2-n-octyl-4-isothiazolin-3-one.

23. The method according to claims 14, wherein the antifouling agent is a mixture of (5Z)-3-butyl-4-bromo-5-(bromomethylidene)-2(5H)-furanone; 3-butyl-5-(dibromomethylidene)-2(5H)-furanone; and 3-butyl-4-bromo-5-(dibromomethylidene)-2(5H)-furanone.

24. The method according to claim 14, wherein the antifouling agent is used at a concentration of 1 to 40% (w/w) of the coating composition.

25. The method according to claim 24, wherein the antifouling agent is used at a concentration from 4 to 20% (w/w) of the coating composition.

26. The method according to claim 25, wherein the antifouling agent is used at a concentration of 15% (w/w) of the coating composition.

27. The method according to claims 14 further comprising at least one component selected from the group consisting of plasticisers, preservatives, solvents, organic, diluents, and water.

28. The method according to claim 14, wherein the coating is applied to the shellfish via painting, spraying, electrostatic spraying, brushing, or dipping.

29. A method of reducing or inhibiting fouling of an aquaculture apparatus, the method comprising treating at least part of a surface of the aquaculture apparatus with an antifouling coating composition comprising: a non-toxic carrier and at least one antifouling agent selected from the group consisting of isothiazolones and furanones.

30. The method according to claim 29, wherein the non-toxic carrier is natural or synthetic or a combination thereof.

31. The method according to claim 30, wherein the carrier is selected from the group consisting of shellac, latex, casein, wax, and hydrogel polymers.

32. The method according to claim 30, wherein the carrier is latex.

33. The method according to claim 30, wherein the carrier is shellac.

34. The method according to claim 33, wherein the carrier is shellac mixed with ethanol comprising shellac at a concentration from 10 to 50% (w/v).

35. The method according to claim 30, wherein the carrier is wax.

36. The method according to claim 29, wherein the isothiazolone is 4,5-dichloro-2-n-octyl-4-isothiazolin-3-one.

37. The method according to claim 29, wherein the antifouling agent is a mixture of (5Z)-3-butyl-4-bromo-5-(bromomethylidene)-furanone; 3-butyl-5-(dibromomethylidene)-2(5H)-furanone; and 3-butyl-4-bromo-5-(dibromomethylidene)-2(5H)-furanone.

38. The method according to claim 29, wherein the antifouling agent is used at a concentration of 1 to 40% (w/w) of the coating composition.

39. The method according to claim 38, wherein the antifouling agent is used at a concentration from 4 to 20% (w/w) of the coating composition.

40. The method according to claim 38, wherein the antifouling agent is used at a concentration of 15% (w/w) of the coating composition.

41. The method according to claim 29 further comprising at least one component selected from the group consisting of plasticisers, preservatives, solvents, organic additives, diluents, and water.

42. The method according to claim 29, wherein the aquaculture apparatus is selected from the group consisting of netting, mesh, panels, trays, ropes, floats, pumps, and monitoring equipment.

43. The method according to claim 29, wherein the coating is applied to the aquaculture apparatus via painting, spraying, electrostatic spraying, brushing, and dipping.

44. A method of manufacturing an antifouling coating composition according to claim 1, the method comprising mixing at least one antifouling agent selected from the group consisting of isothiazolones and furanones with a non-toxic carrier to form a composition which is non-toxic to a cultured marine or aquatic shellfish when applied to the shellfish.

* * * * *